C. S. DEMAREST AND H. F. SHOFFSTALL.
TESTING APPARATUS.
APPLICATION FILED MAR. 19, 1919.
1,361,026.
Patented Dec. 7, 1920.
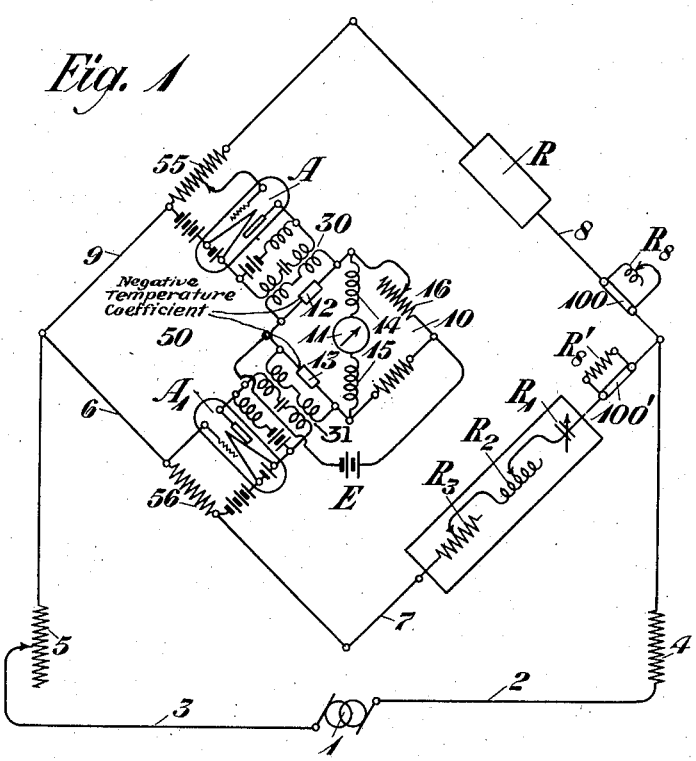
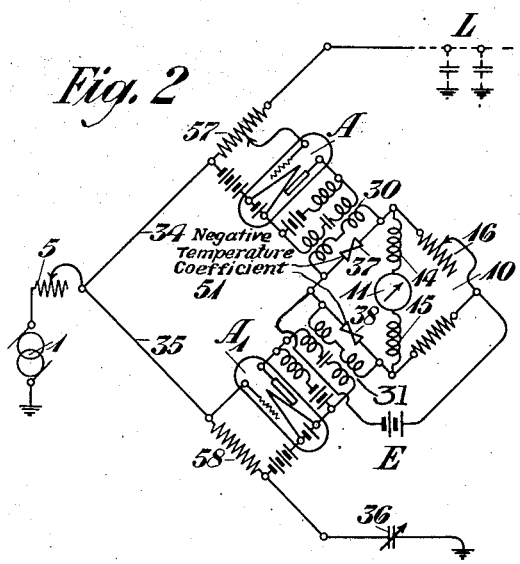
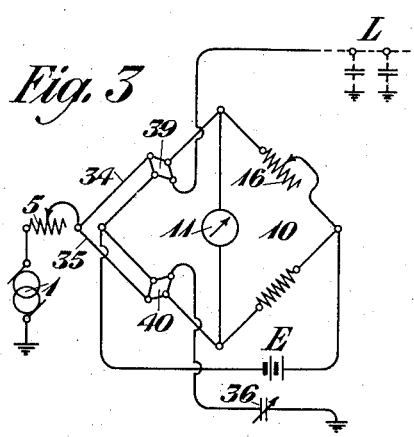
INVENTORS
C. S. Demarest and H. F. Shoffstall
BY
ATTORNEY

UNITED STATES PATENT OFFICE.

CHARLES S. DEMAREST AND HUGH F. SHOFFSTALL, OF BROOKLYN, NEW YORK, ASSIGNORS TO AMERICAN TELEPHONE AND TELEGRAPH COMPANY, A CORPORATION OF NEW YORK.

TESTING APPARATUS.

1,361,026.  Specification of Letters Patent.  Patented Dec. 7, 1920.

Application filed March 19, 1919. Serial No. 283,453.

*To all whom it may concern:*

Be it known that we, CHARLES S. DEMAREST and HUGH F. SHOFFSTALL, residing at Brooklyn, in the county of Kings and State of New York, respectively, have invented certain Improvements in Testing Apparatus, of which the following is a specification.

This invention relates to arrangements for testing or measuring the electrical characteristics of conductors or apparatus.

Irregularities often occur in circuits employed in telephone systems, electric lighting, power, or other systems due to opens, breaks, crosses, or grounds of the conductors or due to derangement or failure of apparatus associated with such circuits. By testing the electrical characteristics of such circuits it is often possible to locate the cause of such irregularities. For example, as the capacity of a conductor, such as a wire, is at certain current frequencies approximately proportional to its length, a means for measuring the capacity of such conductor will afford a means for determining the position in a line of an open or ground or other fault, or of faulty apparatus associated with the line, which fault has been causing irregularities in the circuit. Furthermore by making other measurements, such as of impedance, the relations known to exist between the distance from the sending end of a line to the point in a line where an irregularity occurs, and the impedance frequency characteristics of the line, may be employed in determining the location of a fault due to faulty series or bridged apparatus. By making other measurements of the electrical characteristics of a circuit it is possible to similarly locate other irregularities, which may be due to the occurrence of unstandard conditions causing changes in the electrical constants of apparatus, such as coils, condensers, etc., normally connected to the circuits, or which may be due to accidental removal of such apparatus from the circuit. Furthermore it is often desirable to make laboratory tests of apparatus to be associated with such circuits, or to measure such circuits to determine the proper apparatus to be associated therewith as for example to measure the impedance of lines associated with the well known two-way telephone repeater in order to select suitable networks to balance such lines.

A well known method employed in measuring or testing the electrical characteristics of a circuit or apparatus is to balance said circuit or apparatus against an element of known and variable characteristics by including both circuits or elements in the sides of a branched or divided circuit and adjusting the known element until a condition of balance is obtained between the sides of the divided circuit, the condition of balance being shown by indicating means included in a bridge between the sides of divided circuit.

In former arrangements for making tests or measurements for the above purposes a direct current galvanometer was employed as the indicating means in the bridge between the sides of the divided circuit. Relay means were associated with the galvanometer, which by reversing the connections to the galvanometer once per cycle, served to translate the alternating currents used for testing purposes into direct currents suitable to operate the galvanometer. As it is desirable to make tests or measurements for the above purposes under conditions simulating those existing when the circuits or apparatus are in actual use, the testing currents employed are of different frequencies for different types of measurements or tests. Accordingly these relay means must be adjusted for currents of different frequencies. Such measuring or testing arrangements have not been found to be fully satisfactory or sufficiently accurate due to the effect of variations in the adjustment of the relay means upon the operation of the galvanometer.

In other former arrangements used for making tests or measurements such as laboratory tests, of inductance, impedance, or capacity, the indicating means customarily employed in the bridge between the sides of the divided circuit has been a telephone receiver when high frequency testing current was used, or a telephone receiver with an interrupter in the receiver circuit when low frequency testing current was used. Such arrangements are not accurate as it is often difficult to tell by the telephone receiver when a condition of balance between the sides of the divided circuit has been obtained. Furthermore such an arrangement has the disadvantage of not being direct reading as it does not indicate whether the adjustments made are too high or too low. The use of the telephone receiver has the further disadvantage in that it is not sufficiently sensitive when low frequency current is being used for testing purposes but is limited to use with currents of talking frequencies. A specific instance in which it is desirable to use low frequency current for testing purposes is in the case of the well known two-way telephone repeater. It is necessary to know the impedances of the lines to which the repeaters are connected in order to provide the proper balancing networks for such lines. Heretofore these repeaters have not been designed to efficiently transmit signaling currents of low frequencies, such as 135 cycles, and it has not been necessary to design the networks to provide a balance at this frequency, only voice currents being considered. As the repeaters are now designed to efficiently transmit these signaling currents, more accurate means for measuring the impedance of the lines at low frequencies are required, than the former methods of making these measurements with a bridge employing a telephone receiver.

Accordingly one of the features of the invention is to provide a direct reading and accurate means for measuring impedances, inductances, capacities, or resistances of lines and apparatus with alternating current of any desired frequency and density. Another feature consists in providing means for measuring or testing the characteristics of electrical circuits, which shall be free from errors due to adjustment of apparatus, and which will permit such measurements to be made under conditions which would obtain when they are in service. Another feature consists in providing apparatus for testing electrical conductors for nonstandard conditions due to irregularities such as opens or breaks, grounds or crosses, in such conductors and in providing a means for determining the position of such faults. A further object is to provide means for determining the position in a circuit of apparatus such as coils, condensers, etc., which would cause irregular conditions if not connected to the circuit, or if unstandard in electrical characteristics. Other objects and features of the invention will be clear from the detailed description of its operation.

In the arrangements of this invention the element whose electrical characteristics it is desired to measure or test is balanced against an element of known and variable characteristics. By including said elements in the sides of a branched or divided circuit, a portion of the current transmitted over each of the sides of this divided circuit is employed to control the balance of a normally balanced direct current Wheatstone bridge associated with the divided or branched circuit in such a manner that when a condition of balance exists between the unknown element to be measured and the known and variable element, the Wheatstone bridge will be in its normally balanced condition. This is accomplished by transmitting portions of the current from the divided circuit through special resistance elements included in the arms of the Wheatstone bridge, said resistance elements being of a substance adapted to vary in resistance in proportion to the amount of current flowing therethrough.

In the drawing, Figures 1, 2 and 3 illustrate schematic arrangements embodying the invention. In Fig. 1 is illustrated a general arrangement adapted to measure the alternating current characteristics of an unknown conductor apparatus, while in Figs. 2 and 3 are shown particular forms of this arrangement especially adapted to measuring the characteristics of a conductor such as an open wire line. Like reference numerals have been used to denote similar parts in the figures of the drawing.

In Fig. 1 is shown a divided or branched circuit 50, included in the sides of which are the arms 6 and 7, and 8 and 9. Included in the arm 8 is the conductor R whose unknown characteristics it is desired to measure. If the conductor R should consist entirely of capacity or of inductance or of resistance or of a combination thereof, there is inserted in arm 7 either a variable condenser, such as $R_1$ or a variable inductance such as $R_2$ or a variable resistance such as $R_3$, or a combination thereof as the case may be. A source 1 of alternating current suitable for testing purposes is shown associated with the sides of the divided circuit 50 by means of conductors 2 and 3. This testing current may be suited in frequency to the conditions under which the tests are desired to be made, since the testing means of the arrangements are adapted to making tests with alternating currents of any frequency. For example, if the impedance of a circuit is desired to be measured at a signaling frequency of 135 cycles, the ordinary 135-cycle generator might be used as a source of supply. If capacity tests are to be made on a loaded line, for example, to locate an open or a break a low frequency, such as 16 cycles, would be used since the capacity values obtained would then be more nearly proportional to the length of the line than if a higher frequency were used.

In conductors 2 and 3 are included the resistance elements 4 and 5 respectively. The resistance elements 4 and 5 may be adjusted to a value suitable for regulating the testing current to the desired density in the conductors 7 and 8. Thus the testing current in conductors 7 and 8 may be regulated to the density which would occur in an operating condition of the circuit measured if desired, or it may be limited to a certain maximum value which could be employed without injury to the testing apparatus or the lines measured. Connected in parallel with the arms 6 and 9 of the sides of divided circuit 50 are the vacuum bulb amplifiers $A_1$ and A respectively, having their output circuits terminating in the windings of transformers 31 and 30. The vacuum bulb amplifiers A and $A_1$ are employed where the magnitude of the testing currents is so small that amplification is required to permit accurate measurement, but these amplifiers can be omitted and the transformers 30 and 31 connected directly to the resistances 55 and 56 if the testing currents are sufficiently large. The transformers 31 and 30 are connected in parallel with the resistance elements 13 and 12, included in the arms of the Wheatstone bridge 10. The resistance elements 12 and 13 may be of a material such as tungsten, for example, which has the property of increasing in electrical resistance in proportion to the current flowing through it. Other materials may be used in place of tungsten as, for example, carborundum crystals as illustrated in Fig. 2 by the elements 37 and 38, provided that the substance employed has the principle of varying in electrical resistance in direct or inverse proportion to the current flowing through it. If tungsten is used the resistance will increase for an increase in the current while if carborundrum crystals are used the resistance will decrease for an increase in current. If the resistance elements used are of the balanced type illustrated by elements 39 and 40 of Fig. 3, the inductances 14 and 15 may be omitted from Fig. 1. The inductances 14 and 15, however, serve to prevent fluctuations of the galvanometer needle which might be caused by unbalanced alternating currents in the Wheatstone bridge circuit. Included in one of the arms of the Wheatstone bridge 10 is a variable resistance element 16 whereby the bridge may be normally balanced when no potential is applied to the divided circuit by generator 1. Connected between the sides of the bridge is a direct current measuring instrument or galvanometer 11.

When for purposes of testing or measuring, curent is transmitted from generator 1, equal voltages will be applied to both sides of the divided circuit 50. Since resistances 55 and 56 are equal, equal currents will flow through the sides of circuit 50 when the total impedance of conductor R is equal to the total combined impedance of $R_1$, $R_2$ and $R_3$. This condition may be accomplished by shunting out $R_1$ and $R_2$ and making the noninductive resistance of $R_3$ equal to a known noninductive resistance in arm 8. The connection between the amplifier A and the resistance 55 is then adjusted until the galvanometer reading is zero after a zero reading had previously been obtained with the alternating curent supply disconnected. This adjustment is then maintained during the subsequent test with an unknown quantity in R. If the total impedance of the conductor R is not equal to that of the known and variable elements such as $R_1$, $R_2$, $R_3$, or combinations thereof, unequal currents will flow through the sides of divided circuit 50. This will cause currents of unequal strength to flow through the vacuum bulbs A and $A_1$ connected in parallel with the sides of circuit 50 and through the transformers 30 and 31 and through the resistance elements 12 and 13, respectively, of the normally balanced Wheatstone bridge 10. These unequal currents will accordingly cause resistance elements 12 and 13 to change in value proportionally, and cause an unbalanced condition to exist in the Wheatstone bridge 10 which unbalanced condition will be evidenced by a deflection of the needle of galvanometer 11. If the current through amplifier A is larger than that through amplifier $A_1$ which occurs when the impedance of R is smaller than that of $R_1$, $R_2$, and $R_3$, combined, resistance 12 will be made greater than resistance 13 and the galvanometer 11 will be deflected in the corresponding direction due to current from the battery E. If the circuit is unbalanced in the opposite manner, that is the combined impedance of $R_1$, $R_2$ and $R_3$ being smaller than that of R, the current from amplifier $A_1$ and consequently through resistance 13 will be greater than that through resistance 12 and resistance 13 will be greater. Thus the direct current Wheatstone bridge circuit will be unbalanced and the galvanometer 11 deflected in the direction opposite to that previously described in which the impedance R was the one of lower value. Accordingly either the variable condenser $R_1$ or the variable inductance $R_2$ or the variable resistance $R_3$, or combinations thereof, will now be adjusted until a condition of balance exists between the opposite sides of divided circuit 50 and the currents flowing through said sides are equal. When the current flow through said sides is equal, the currents flowing through the resistance elements 12 and 13 will cause equal changes in the resistances of said elements and will not disturb the normal balance of the Wheatstone bridge 10, which condition of balance will be indicated by a zero reading of the galvanometer 11. As the current flowing through the sides of divided circuit 50, which includes the unknown element R, is proportional to the characteristics such as capacity, inductance, resistance or combinations thereof of the element R and as equal potentials are applied from generator 1 to both sides of the circuit 50, it will be seen that when a condition of balance is obtained between the sides of circuit 50, the total impedance of the element R will be equal to the total impedance of either of the known elements $R_1$, $R_2$, $R_3$ or combinations thereof, as the characteristics of these latter elements are known, and means is afforded for measuring the characteristics of the unknown element R. The connection between amplifier A and the resistance 55 is adjustable in order that practical inequalities in the amplifier circuits A and $A_1$ may be compensated for and an adjustment obtained whereby equal alternating currents flow through resistances 12 and 13, thus resulting in zero deflection of the galvanometer when both the alternating current and direct current circuits 50 and 10 are balanced.

With this arrangement it is furthermore possible to determine the sign of the reactance in the unknown element R and also to measure the magnitude of this reactance. If in measuring the unknown conductor R a balance has first been obtained with a non-inductive resistance $R_s$ only in the circuit 7, the sign of the reactance in the unknown circuit R may be indicated by opening switch 100 and placing the inductive resistance $R_s$ in branch 8, and by opening switch 100' which places the non-inductive resistance $R_s'$ in branch 7. The resistance $R_s'$ balances the non-inductive component of the variable inductance $R_s$ in branch 8. If on doing this the galvanometer deflection indicates that the impedance in R is too high for a balance with any inductance added to this circuit then the reactance of R is positive. If the addition of any inductance, however small, in branch 8 causes the impedance in that conductor to be too low for a balance then the reactance of R is negative. The magnitude of this negative reactance may be determined by increasing the inductance $R_s$ in branch 8 to the point where a further increase increases the total impedance of this branch instead of reducing it. The positive reactance of $R_s$ is then equal to the negative reactance of R. If the reactance in R is found to be positive instead of negative, the addition of a variable capacity to branch 8 of the circuit, instead of a variable inductance could be employed in the same manner to measure the magnitude of this positive reactance.

The impedance measurements obtained upon a line at a series of different frequencies may be employed in the location of irregularities in the line by the well known relations between these measurements and distance from the sending end to the point in the line where the irregularity exists. With the above described arrangement these impedance frequency characteristics may be measured for low frequencies such, for example, as signaling frequencies, as well as for the higher voice frequencies. Thus an irregularity due to unstandard conditions in apparatus connected to the line and tuned to have low impedance at some particular low frequency, but having very high impedance voice frequencies, may be located.

In Fig. 2 is illustrated an arrangement specially adapted for measuring the capacity of a single line wire, such as L, or a pair of wires. Similar reference numerals have been used to denote like parts with respect to Fig. 1. Alternating testing current is supplied from a generator 1 to the sides 34 and 35 of a divided or branched circuit 51, to the side 34 of which is connected the line L whose unknown capacity it is desired to measure. As the capacity of a line with respect to the earth, or between two line conductors, is at certain current frequencies approximately proportional to its length, a means for measuring the capacity of a line affords a means of determining the position on such a line of a break or opening in the circuit which would cause unstandard conditions thereon. Accordingly there is inserted in side 35 a condenser 36 of known and variable capacity. The variable condenser 36 is employed only if the capacity of L is desired to be measured directly in capacity units, while a variable resistance may be substituted for the condenser 36 if it is not necessary to read the capacity values directly, since for a balanced condition a resistance element in place of condenser 36 would vary inversely with the capacity of L and arbitrary relations between this resistance and the capacity could be employed. The same potential is applied from generator 1 to the sides 34 and 35 of circuit 51 and the variable condenser 36 is now adjusted until a condition of balance is obtained between said sides and the currents flowing thereover are equal. The means for indicating when such a condition of balance has been attained are substantially similar to those illustrated for Fig. 1, except that the resistance elements 37 and 38 in the arms of the Wheatstone bridge, which are varied in magnitude in proportion to the current transmitted therethrough, are shown as carborundum crystals. Other materials may be used in place of carborundum crystals for the elements 37 and 38, provided that the substance employed has the property of varying in electrical resistance in direct or inverse proportion to the current flowing through it. If carborundum is used the resistance will decrease for an increase in the current, which is the opposite to that occurring with the tungsten elements in Fig. 1. The same type of resistance elements, however, could be used in place of 37 and 38 Fig. 2, as those shown at 12 and 13 of Fig. 1, or as those shown as 39 and 40 of Fig. 3.

If the balanced elements such as 39 and 40 of Fig. 3 are used in Fig. 2 the inductances 14 and 15 may be omitted from this arrangement. As the arrangements of Fig. 2 are in other respects substantially similar to those of Fig. 1, a further description thereof will be omitted.

In Fig. 3 is shown an arrangement adapted to measure the capacity of a line such as L which is substantially similar to the arrangement described in Fig. 2. In Fig. 3 there is substituted for the carborundum crystals 37 and 38 of Fig. 2 and for the resistance elements 12 and 13 of Fig. 1 the variable resistance elements 39 and 40, each of which elements in itself forms a Wheatstone bridge network, so that the alternating current applied to it from the generator 1 does not cause any potential across the points where the resistance element is connected to the normally balanced direct current Wheatstone bridge circuit 10. The resistance elements 39 and 40 might consist of some wire or material, such as tungsten for example, whose resistance value increases appreciably with small changes in the current density. As the principles involved in the arrangement of Fig. 3 are substantially the same as those of Fig. 2, a further description thereof will be omitted. While the arrangement of Fig. 3 has not been shown to include amplifiers, as the arrangements in Figs. 1 and 2, since these are not needed where the testing currents are sufficiently large, the resistance elements may be connected through amplifiers to the branches 34 and 35, instead of being directly connected, if the testing currents are desired to be small. While the arrangements of Figs. 2 and 3 have been illustrated as adapted for measuring the capacity of a line, it is to be noted that by substituting for the condenser 36 either variable inductance or variable resistance elements that characteristics of the line L, other than capacity, may be measured.

While the invention has been disclosed as embodied in certain specific arrangements which have been deemed desirable it is to be understood that it is capable of embodiment in many and widely varied forms without departing from the spirit of the invention as defined in the appended claims.

What is claimed is:

1. A circuit divided in two branches, means to balance one of said branches with respect to the other, a Wheatstone bridge system associated with said branches, and means controlled by the condition of balance in said divided circuit for controlling the balance of said Wheatstone bridge system.

2. A circuit divided in two branches, means to apply currents of equal voltage to said branches, means to vary the electrical characteristics of said branches, a normally balanced Wheatstone bridge system, and means controlled by the currents in said branches for varying the electrical characteristics of the arms of said bridge system.

3. A circuit divided in two branches, means to apply currents of equal voltages to said branches, means to vary the electrical characteristics of said branches thereby varying the amount of current flow therethrough, a normally balanced Wheatstone bridge system, and means to transmit through arms of said bridge system portions of the currents flowing through said branches.

4. A circuit divided in two branches, means to apply currents of equal voltages to said branches, means to vary the electrical characteristics of said branches thereby varying the currents flowing therethrough, a normally balanced Wheatstone bridge system, elements in opposite arms of said bridge system adapted to change in resistance in proportion to the current flow therethrough, and means to transmit through said elements portions of the currents flowing through said branches.

5. A circuit divided in two branches, a source of alternating current, means to apply currents of equal voltages from said source to said branches, means to vary the electrical characteristics of said branches thereby varying the currents flowing therethrough, a normally balanced direct current Wheatstone bridge system, equal elements in opposite arms of said bridge system adapted to change in resistance in proportion to the current flow therethrough, and means to transmit through said elements portions of the currents flowing through said branches.

6. A circuit divided in two branches, means to apply alternating currents of equal voltages to said branches, means for varying the electrical characteristics of said branches, a normally balanced direct current Wheatstone bridge system, elements in the arms of said bridge system adapted to change in resistance in proportion to the current flow therethrough, and means to connect said elements electrically with said branches.

7. A circuit divided in two branches, means to apply alternating currents of equal voltages to said branches, means for varying the electrical characteristics of said branches, a normally balanced direct current Wheatstone bridge system, elements in the arms of said bridge adapted to change in resistance in proportion to the current flow therethrough, means to amplify portions of the currents in said branches, and means to transmit said amplified currents through said elements.

8. A circuit divided in two branches, means for applying alternating currents of equal voltage to said branches, a conductor of unknown capacity associated with one of said branches, a variable condenser of known capacity associated with the other of said branches for balancing said branches, a normally balanced direct current Wheatstone bridge system, a galvanometer and inductances connected between the arms of said bridge system, elements in the arms of said bridge system adapted to change in resistance in proportion to the current flow therethrough, means to amplify portions of the currents in said branches, and means to transmit said amplified currents through said elements.

In testimony whereof we have signed our names to this specification this 18th day of March, 1919.

CHARLES S. DEMAREST.
HUGH F. SHOFFSTALL.